UNITED STATES PATENT OFFICE.

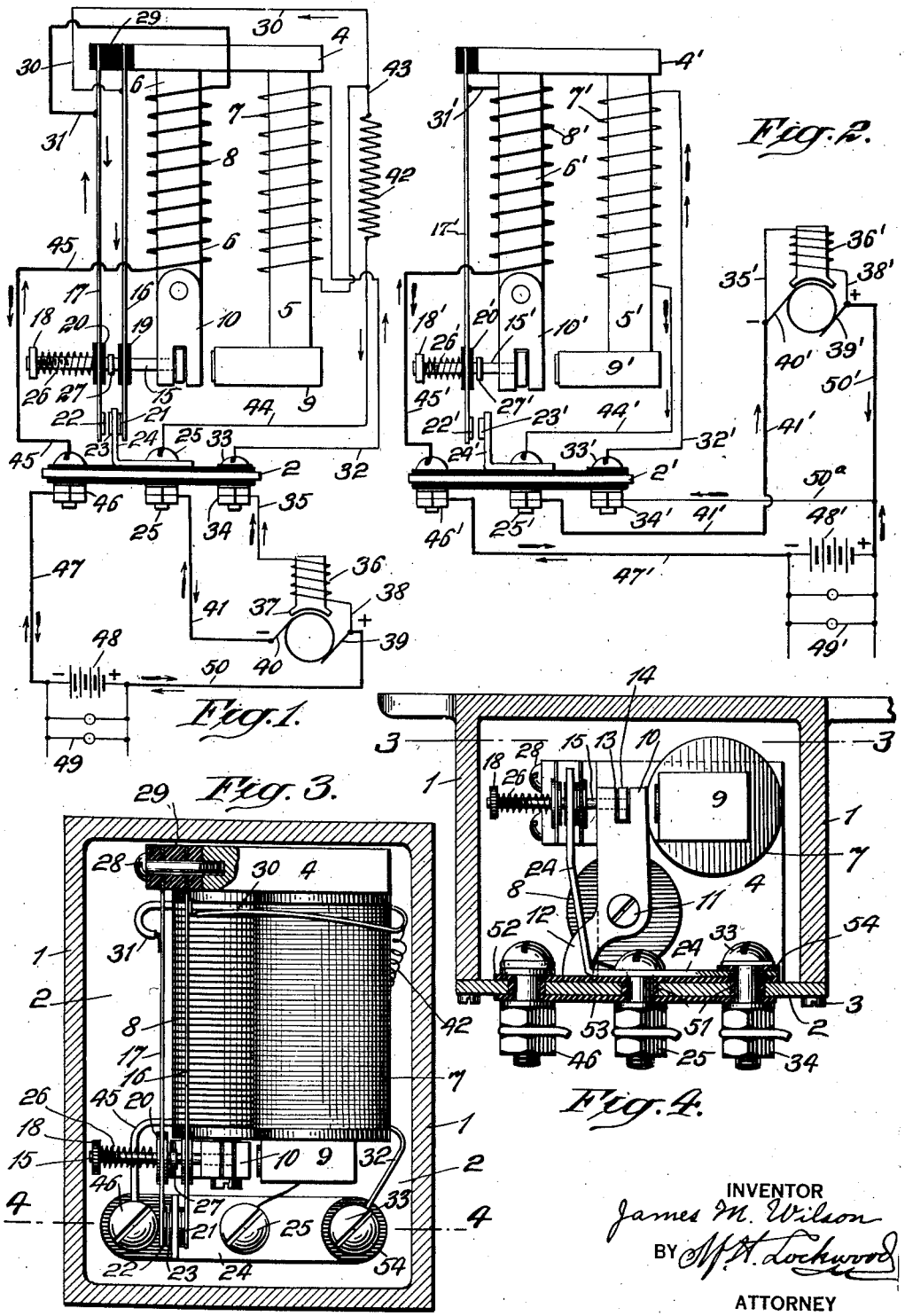

JAMES M. WILSON, OF NEWARK, NEW JERSEY, ASSIGNOR TO RAY S. LANZ, OF NEWARK, NEW JERSEY.

RELAY FOR STORAGE-BATTERY-CHARGING SYSTEMS.

1,344,970.      Specification of Letters Patent.      Patented June 29, 1920.

Application filed October 4, 1918. Serial No. 256,810.

*To all whom it may concern:*

Be it known that I, JAMES M. WILSON, a citizen of the United States, and resident of the city of Newark, county of Essex and State of New Jersey, have invented certain new and useful Improvements in Relays for Storage-Battery-Charging Systems, of which the following is a specification.

My invention relates more particularly to relays adapted for use in connection with a motor car dynamo lighting and ignition system including a storage battery. In systems of this kind it is customary that current for the lighting and ignition system is derived from a storage battery when the motor is running at such a low speed that the potential of the dynamo current is below that of the storage battery. When, however, the speed of the motor is such as to give to the dynamo current a potential greater than that of the storage battery, the storage battery is adapted to be cut into the circuit and charged so long as the speed of the motor and dynamo are sufficiently high to keep the potential above that of the storage battery. The object of the cut-out relay is to protect the storage battery from discharging through the dynamo as soon as the potential of the dynamo current drops below that of the storage battery.

In the usual type of cut-out relay, the circuit is closed and opened by means of a contact mounted on a movable armature coöperating with a contact mounted on a stationary element. In such a construction vibration of the engine often causes the movable armature to chatter and the contacts may become fused together especially when the amount of current passing through the coils is barely sufficient to hold the movable armature closed against its spring action. Because of this action, the contact will not be broken when the potential of the dynamo current drops below that of the battery, thus permitting the discharge of the battery through the dynamo to the possible injury of both.

The object of my improved relay construction is to insure uniform and continuous pressure of the contact points when once the circuit is closed, independent of the movable armature, and provide for a quick and complete breaking of the battery circuit when the potential of the dynamo drops below the potential of the storage battery. A further object is to arrange the fine and coarse wire coils on different poles and provide for a polarized armature adapted to be attracted or repelled by the pole or pole-piece of the fine wire coil. By this arrangement the coarse wire coil is adapted to carry the battery current, and while the battery is being charged, polarize the armature so as to be attracted by the pole-piece of the fine wire coil. As soon, however, as the potential of the dynamo current drops below that of the storage battery, the current in the coarse wire coil is reversed, thus reversing the polarity of the polarized armature so that the latter is repelled by the pole-piece of the fine wire coil and attracted at its lower end by the soft steel supporting plate, thus giving a positive action for breaking the contact and cutting out the storage battery. A further object is to provide a regulating relay adapted to throw in a resistance when the potential of the dynamo current passes above a predetermined maximum. This is accomplished by connecting the fine wire coil in series with the field coil of the dynamo and arranging to cut in the resistance coil in series with the fine wire coil and field coil when the potential of the dynamo becomes too great.

For illustrating my improved construction, I have shown one form of my regulating relay in the accompanying drawings and diagrammatically the construction of my cut-out relay. Referring to the accompanying drawings—

Figure 1 represents diagrammatically the connections and arrangement of circuits in one form of my regulating relay;

Fig. 2 represents diagrammatically the circuit and operating connections of my cut-out relay;

Fig. 3 is a plan view of my improved regulating relay, looking downward from the section line 3—3 of Fig. 4; and Fig. 4 is an end view of the relay, the case being in section along the line 4—4 of Fig. 3.

My improved regulating relay will be more particularly understood by reference to Figs. 1, 3 and 4 of the drawings, Figs. 3 and 4 showing a physical embodiment of the device, while Fig. 1 represents the device diagrammatically with a conventional showing of the electrical connections. The device is preferably inclosed in a suitable casing or cover 1, the open mouth of which is adapted to be closed by a cover plate 2 secured to the casing by suitable screws 3, as indicated in Fig. 4 and also by a concealed sealing screw (not shown) to prevent unauthorized persons tampering with the relay. The plate 2 is preferably adapted to support the various parts of the mechanism and is preferably of soft iron or steel. Secured to the supporting plate 2 is a yoke 4 to which are secured two pole-pieces 5 and 6 preferably extending in parallel relation to each other and to the supporting plate 2, as indicated in the drawings. The magnetic pole 5 is preferably surrounded by windings 7 of fine wire, while the pole 6 is surrounded with coarse wire windings 8, the windings being adapted to be connected with a source of current so as to form electromagnets in the usual or any preferred manner. The poles 5 and 6 are preferably arranged diagonally with respect to the yoke plate 4, as indicated in Fig. 4 of the drawings, and the pole 5 is provided with a pole-piece 9 adapted to project laterally into position to coöperate with the upper end of a movable pole-piece or armature 10, preferably pivotally secured by a screw 11 to the end of the pole 6 and adapted to be polarized thereby. The windings 7 and 8 and the direction of current therethrough is such that under certain conditions the armature 10 is attracted by the pole-piece 9 and under certain other conditions will be repelled thereby. Preferably, the polarized armature 10 is provided with an extension or heel 12 projecting downwardly and laterally from the pivot 11 and adapted to coöperate with the soft iron supporting plate 2 to assist in withdrawing the armature 10 when the upper end thereof is repelled by the pole-piece 9. When a current is passed through the fine wire coil 7 to energize the pole 5, the pole-piece 9 and the supporting plate 2, because of their magnetic connection will be oppositely polarized. Therefore, when the polarized armature 10 is repelled by one, it will be attracted by the other. Advantage is taken of this by adding the heel 12 to insure quick and positive movement of the armature 10. The upper free end of the armature 10 is preferably slotted at 13 and has mounted therein, the loosely fitting head 14 of a bolt 15 loosely fitting and passing through a hole through one leg of the upper end of the armature 10, as indicated in Figs. 3 and 4 of the drawing. The fitting of the bolt 15 in relation to the armature 10 is made loose in order that the armature may partake of its movement toward and from the pole-piece 9 without deflecting the bolt 15. The bolt 15 preferably passes through leaf-spring contact carrying members 16 and 17 near their free ends and is provided at its outer end with threads adapted to coöperate with a nut 18. Each of the leaf-springs 16 and 17 is preferably provided with insulating bushings 19 and 20 surrounding and preventing the bolt 15 from having electrical contact with the leaf-springs 16 and 17. In the normal position of the parts, as indicated in Figs. 1, 3 and 4, the contact 21 carried by the leaf-spring 16 is closed while the contact 22 carried by the leaf-spring 17 is open or the circuit broken. The contacts 21 and 22 are adapted to coöperate with a fixed contact member 23 mounted upon an upwardly extending arm 24 secured by and in electrical contact with a screw 25.

Between the nut 18 on the end of the armature bolt 15 and the leaf-spring 17, I preferably mount on the bolt a coiled spring 26, the tension of which may be adjusted by the nut 18. The object of the spring 26 is to permit forcing the closing of the contact 22 by resilient pressure and holding the contact closed under such pressure, so that there is less likelihood of the circuit being broken by the jar of the vehicle. The bolt 15 is preferably provided with a shoulder or collar 27 between the bushings 19 and 20 of the leaf-springs 16 and 17, this collar being formed as part of or secured to the bolt 15 and adapted to strike and carry along the leaf-spring 16 when the armature 10 is moved toward the pole-piece 9 a predetermined maximum amount, thereby breaking the contact 21 and opening the circuit therethrough.

The inner or fixed ends of the contact springs 16 and 17 are preferably mounted upon and secured to the yoke-piece 4 by screws 28, substantially as indicated in Figs. 3 and 4 of the drawings. The fixed ends of the leaf-springs 16 and 17 are preferably insulated from each other and from the yoke 14 by suitable blocks of insulation indicated at 29 in the drawings, the screws 28 being adapted to clamp and hold the insulation and the contact springs in proper fixed relation.

As will be seen in Figs. 1 and 3, one end 30 of the fine wire coil 7 is electrically connected to the contact spring 16 and one end 31 of the coarse wire coil 8 is connected with the contact spring 17. The opposite end 32 of the fine wire coil is connected to a screw 33 having binding nuts 34 whereby through the wire 35 it is connected in series with the field coil 36 of the dynamo 37. The other end 38 of the field coil is connected to the brush 39 of the dynamo, the circuit being completed from the other brush 40 by the wire 41 leading to the binding post 25 which, as previously pointed out, is electrically connected through the contact strip 24 and contact 21 with the spring contact member 16. In parallel with the current through the contacts 21, 24, I preferably connect a resistance coil 42 of suitable character, one end being connected at 43 with the end 30 of the fine wire coil and the other end 44 connected to the screw 25, as indicated in Fig. 1 of the drawings. It will thus be seen that when the contacts 21, 24 are separated, the resistance 42 will be placed in series with the fine wire coil 7 and the field coil 36 of the dynamo and effect a reduction of the potential of the latter.

When the contacts 22, 23 are closed, the dynamo circuit through the storage battery and load is completed through the wire 41, contact spring 17 and coarse wire coil 8. The other end 45 of the coarse wire coil is connected with a binding screw 46, from which a wire 47 leads to the storage battery 48 and lamp circuit 49, the circuit being completed by the wire 50 leading to the dynamo brush 39. (See Fig. 1.) The binding posts or screws 25, 33—34 and 46 are preferably mounted upon the supporting plate 2 and insulated therefrom as indicated in Fig. 4 of the drawings. The screws pass through holes bushed with fiber or the like at 57 and are further insulated from the plate 2 by strips of fiber 52 and 53 on each side of the plate. It will be seen in Figs. 3 and 4 that the contact strip 24 is secured by the screws 25 and 33, the screw 25 being in electrical contact therewith. The screw 33 is, however, insulated from the strip 24 by the washer 54 as indicated in Fig. 4. Since the strip 24 is in electrical circuit only with the screw 33 it is not shown under screw 25 in the diagram of Fig. 1.

In the operation of the regulating relay of Figs. 1, 3 and 4, it will be understood that when the dynamo 37 is started the current passes through the field 36, and fine wire coil 7 through the normally closed contact 21, energizing the pole 5, pole-piece 9 and armature 10, so that the latter is attracted toward the pole-piece 9. As soon as the potential of the dynamo current becomes greater than that of the storage battery 48, the armature 10 will have moved over far enough to close the contact 22 and throw in the battery 48 for charging. The direction of the current while the battery is charging is indicated by the thin unfeathered arrows. If now the speed of the motor and hence of the dynamo should continue to increase the potential will continue to rise. To prevent excessive rise of potential which might prove detrimental to the battery and apparatus, I preferably provide for cutting down the potential by reducing the current through the field coil 36. As the potential rises the armature 10 is further moved over until the collar 27 on the bolt 15 by contact with the insulation bushing 19 moves the contact spring 16 and breaks the contact 21. Breaking the contact 21 has the effect of compelling all the field current to go through the resistance 42, thereby reducing the magnetic field and hence the potential of the dynamo current.

Should the dynamo potential drop below that of the battery, then the battery current will predominate and will flow back in the direction indicated by the feathered arrows. When this occurs, the current in the coarse wire coil 8 is reversed and the armature 10 is oppositely polarized so that there is mutual repulsion between it and the pole-piece 9, whereby the contact 22, 23 is broken and the storage battery cut out.

When this reversal occurs, the armature 10 and pole-piece 9 are of the same polarity and repel each other but the tail-piece or heel 12 of the armature of pole end 10 and the supporting plate 2 below it are of opposite polarity and attract each other, the repulsion of the upper end of the armature or pole end 10 and the attraction of the lower end or heel 12 tend to move the armature in the same direction, thus assisting in the positive and quick breaking of the contact. The quick breaking action is further assisted by the slight hammer or impact blow of the collar 27 against the contact spring member 17 when the movement of the armature or pole end is reversed as just described.

In the cut-out form of my relay, the mechanism and arrangement of the parts are substantially as shown in Figs. 3 and 4, except that the normally closed contact, and the regulating resistance are omitted. The connections and construction of my cut-out relay are illustrated diagrammatically in Fig. 2 of the drawings where the parts and connections corresponding with those in Fig. 1 are given the same indicating characters with a prime mark. From an examination of the connections in Fig. 2, it will be seen that the dynamo field coil 36' is connected in shunt by the wires 35' and 38'. When the current is building up, a portion of it is passing through the main circuit 50' through 50ᵃ to the screw-post 33'—34', then through the wire 32' to the fine wire coil 7', through the latter and back to the screw-post 25' then by the wire 41' to the dynamo brush 40'. The armature 10' is attracted by the pole-pieces 9' and when the potential of the dynamo exceeds that of the battery 48' the contact 22' is closed thereby placing the coarse wire coil 8' and the battery in circuit. When this occurs and the battery is charging, the dynamo current will flow through the several circuits as indicated by the light unfeathered arrows. The circulation of the current through the coarse wire coil 8' when the battery is charging strengthens the pull or holding capacity of the armature 10' to keep the contact 22' closed. The resilient connection between the armature 10' and the contact spring 17' is substantially identical with that previously described for the regulating relay and will be understood therefrom.

When the potential of the dynamo drops below that of the battery, then the current flows as indicated by the feathered arrows in Fig. 2, which reverses the polarization of the armature 10', causing mutual repulsion between the latter and the pole-piece 9' thereby breaking the contact 22' and cutting out the battery.

In both forms of my relay as illustrated, the repulsion of the armature is adapted to give a quick and positive break of the battery circuit. The collar 27—27' may be so adjusted as to give the leaf-spring 17—17' a blow when the armature is repelled and thrown back, thus releasing it if there should be any slight fusion of the contacts or tendency for them to stick.

Obviously, the physical embodiment of my improved relay may be varied without varying the principles involved and the battery and dynamo circuits may be connected in various ways to obtain the effect described.

The form and mounting of the armature and its resilient connection with the contact member may be varied, therefore, I do not wish to be limited to the specific construction and arrangement of the forms shown for various modifications may be made without departing from the spirit and scope of the invention.

I claim—

1. In a relay of the character described, the combination with a dynamo and storage battery, of an electro-magnet of fine wire and an electro-magnet of coarse wire, said magnets being so mounted that one of the free pole ends is movable toward and from the other, connections with the dynamo for energizing said magnets so that the pole pieces mutually attract, the movable pole thereby moving toward the other, connections whereby the storage battery is adapted for energizing said electro-magnets so that said poles mutually repel and one moves away from the other, when the potential of the dynamo drops below that of said battery, said last named connections including a resiliently mounted contact cooperating with a fixed contact, and means whereby said movable pole end, when repelled, is adapted to deliver a hammer or impact blow for separating said contacts should they stick.

2. In a relay of the character described, the combination with a dynamo and storage battery, of an electro-magnet of fine wire and an electro-magnet of coarse wire, said magnets being so mounted that one of the free poles ends is movable toward and from the other, connections with the dynamo for energizing said magnets so that the pole pieces mutually attract and one pole end moves toward the other, contacts including a resiliently mounted contact adapted to be moved by said movable pole and when the latter is moved toward the other pole, to close the storage battery circuit through said coarse wire magnet, the arrangement being such that the polarity of said coarse wire magnet is adapted to be reversed when the dynamo potential drops below that of said battery, whereby the poles repel each other and said contacts are adapted to separate, thus cutting out the battery, said resiliently mounted contact being separately mounted from said movable pole end, and means carried by said movable pole end for delivering a hammer or impact blow for separating said contacts should they stick.

3. In a regulating relay of the character described, the combination with a dynamo and storage battery, of an electro-magnet comprising two poles in parallel relation, one pole being wound with a fine wire and the other with a coarse wire, the pole end of one of said poles being mounted for movement toward and from the other, connections including contact members, normally closed, for sending the dynamo current through said fine wire coil, thereby causing a movement of said movable pole end toward the other pole-piece, contact members normally open for completing the circuit through said coarse wire coil and said battery, means including a resilient member carried by said movable pole end for closing said normally open contacts, means carried by said movable pole end whereby said normally closed contacts are opened when said pole end has moved a predetermined distance and a resistance adapted to complete the dynamo circuit through said fine wire windings when said normally closed contacts are separated.

4. In a regulating relay of the character described, the combination with a dynamo and storage battery of an electro-magnet comprising two poles in parallel relation, one pole being wound with fine wire and the other with coarse wire, the pole end of one of said poles being movable toward and from the other, connections including contact members, normally closed, for sending the dynamo current through said fine wire coil, thereby causing a movement of said movable pole end toward the other pole-piece, connections including contacts, normally open, for including the storage battery in circuit with said coarse wire windings, means whereby said pole end is adapted to close said last named contacts when the potential of said dynamo current is greater than the battery potential, means operable by said movable pole end for breaking said first named contacts, when the potential of the dynamo current exceeds a predetermined amount and a resistance adapted to complete the dynamo circuit through said fine wire windings when said first named contacts are separated, the connections being such that when the potential of the dynamo drops below that of the battery, the battery current through said coarse windings will reverse the polarity of said movable pole end, whereby it is repelled and adapted to restore said contacts to normal and cut out said storage battery.

5. A relay of the character described, comprising an electro-magnet having a pair of poles, a soft iron supporting plate extending parallel with said poles to which said magnet is secured, fine wire windings on one pole and coarse wire windings on the other, a movable pole-piece connected with and adapted to be polarized by said coarse wire pole to be attracted or repelled by the pole piece of said fine wire pole, and a heel extension of said movable pole piece adapted to coöperate with and be attracted by said supporting plate when said pole-pieces repel each other.

6. In combination with a dynamo and storage battery, a relay of the character described, comprising an electro-magnet having a pair of poles, a soft iron supporting plate therefor, fine wire windings on one pole and coarse wire windings on the other, a movable pole-piece connected with and adapted to be polarized by said coarse wire pole to be attracted or repelled by the pole-piece of said fine wire pole, connections for sending the dynamo current through said windings, connections including contacts, normally open, for placing the storage battery in circuit with said coarse windings, mechanical connections whereby said movable pole-piece when attracted by the other pole, is adapted to close said contacts when the potential of the dynamo current is greater than that of the battery, the battery current being adapted to reverse the polarity of said coarse wire coil when the potential of the dynamo drops below that of the battery and means whereby when said reversal takes place and the movable pole-piece is repelled it is adapted to deliver a hammer or impact blow to release said contacts should they stick.

7. In combination with a dynamo and storage battery, a relay of the character described comprising an electro-magnet having a pair of poles, a soft iron supporting plate therefor, fine wire windings on one pole and coarse wire windings on the other, a movable pole-piece connected with and adapted to be polarized by said coarse wire pole to be attracted or repelled by the pole-piece of said fine wire pole, connections for sending the dynamo current through said fine wire windings, connections including contacts, normally open, for placing the storage battery in circuit with said coarse windings, mechanical connections including a resilient member whereby said movable pole-piece is adapted to close said contacts and hold them closed through the medium of said resilient member when the potential of the dynamo current is greater than that of the battery, the circuit connections being such that when the potential of the dynamo drops below that of the battery the polarity of the said coarse windings will be reversed and said movable pole-piece repelled to open said contact and cut out the battery, and means whereby said movable pole-piece when thus repelled is adapted to deliver a hammer or impact blow to open said contacts, should they stick.

8. In combination with a dynamo and storage battery, a regulating relay of the character described, comprising an electro-magnet provided with two poles in parallel relation, windings of fine wire on one pole and coarse wire on the other, dynamo connections including said fine windings in the field circuit, contacts normally closed, to complete said dynamo circuit, contacts normally open, for closing the circuit through said coarse wire coil and said storage battery, a movable pole-piece connected with said coarse wire pole and movable toward and from the other pole, resilient means carried by said movable pole-piece for closing said normally open contacts, said resilient means being adapted to permit further movement of said movable pole piece, a resistance coil connected across the normally closed contacts and adapted to carry all the current through said fine wire and the dynamo field when said normally closed contacts are open and means whereby said movable pole-piece, after closing the normally open contacts, by further movement is adapted to open said normally closed contacts when the potential of the dynamo rises above a predetermined amount.

9. In combination with a dynamo and storage battery, a regulating relay of the character described comprising a two pole-electro-magnet, one pole being wound with fine wire and the other with coarse wire, connections including contacts, and normally closed, for connecting said fine wire coil in series with the field coil of the dynamo, a resistance connected across said contacts and adapted to complete the circuit, in series with said fine wire coil and the dynamo field coil when said contacts are open, a second pair of contacts, normally open adapted to close the storage battery circuit through said coarse wire coil when the battery is charging, a movable pole-piece pivotally connected with the pole of said coarse wire coil and adapted to be polarized thereby, the free end of said pole-piece being adapted to move toward and from the pole-piece of the fine wire coil, a member connected with said pole-piece for closing said second pair of contacts when the pole-piece is moved by attraction toward said fine wire pole-piece and means connected with said movable pole-piece for breaking the first named contacts when the movement of said pole-piece exceeds a predetermined amount.

10. In a relay of the character described, the combination with a dynamo and storage battery, of an electro-magnet of fine wire and an electro-magnet of coarse wire, said magnets being so mounted that one of the pole ends is movable toward and from the other, connections with the dynamo for energizing said magnet so that the pole-pieces mutually attract and one moves toward the other, contacts adapted to close when said movable pole-piece moves toward the other, to close the storage battery circuit through said coarse wire magnet, the polarity of said coarse wire magnet being adapted to be reversed when the dynamo potential drops below that of said battery, whereby the poles repel each other and said contacts are separated, and means whereby the movable pole, when the battery current reverses and is thus repelled, is adapted to deliver a hammer or impact blow to open said contacts.

JAMES M. WILSON.